US011947119B2

(12) United States Patent
Sato et al.

(10) Patent No.: US 11,947,119 B2
(45) Date of Patent: Apr. 2, 2024

(54) DISPLAY CONTROL DEVICE, DISPLAY CONTROL METHOD, AND RECORDING MEDIUM

(71) Applicant: SONY GROUP CORPORATION, Tokyo (JP)

(72) Inventors: Tetsuro Sato, Tokyo (JP); Yasutaka Fukumoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/760,393

(22) PCT Filed: Feb. 8, 2021

(86) PCT No.: PCT/JP2021/004597
§ 371 (c)(1),
(2) Date: Aug. 9, 2022

(87) PCT Pub. No.: WO2021/166717
PCT Pub. Date: Aug. 26, 2021

(65) Prior Publication Data
US 2023/0062045 A1 Mar. 2, 2023

(30) Foreign Application Priority Data
Feb. 17, 2020 (JP) .................. 2020-024344

(51) Int. Cl.
*G02B 27/01* (2006.01)
*A63F 13/21* (2014.01)
(Continued)

(52) U.S. Cl.
CPC .......... *G02B 27/0172* (2013.01); *A63F 13/21* (2014.09); *A63F 13/25* (2014.09);
(Continued)

(58) Field of Classification Search
USPC ............................................. 345/8
See application file for complete search history.

(56) References Cited

U.S. PATENT DOCUMENTS 9,696,795 B2 * 7/2017 Marcolina ............... G06T 17/10
2013/0288761 A1 * 10/2013 Santos Paiva Ferraz
                                 Conceicao .............. A63F 13/00
                                 463/7

(Continued)

FOREIGN PATENT DOCUMENTS

JP       2018-136950 A     8/2018
WO     2014/061310 A1   4/2014
WO     2014/162762 A1  10/2014

OTHER PUBLICATIONS

International Search Report and Written Opinion of PCT Application No. PCT/JP2021/004597, dated Mar. 30, 2021, 08 pages of ISRWO.

*Primary Examiner* — Chineyere D Wills-Burns
(74) *Attorney, Agent, or Firm* — CHIP LAW GROUP

(57) ABSTRACT

A display control device includes: an acquisition unit that acquires right hand position information indicating a position of a right hand of a user and left hand position information indicating a position of a left hand of the user of a head mounted display; and a display control unit that: controls the head mounted display to arrange a virtual object having a certain size at the position of the right hand and the position of the left hand based on of the right hand position information and the left hand position information; and controls the head mounted display to change a position of the virtual object independently of a change in a distance between a right hand and a left hand while maintaining a display state of the virtual object.

13 Claims, 11 Drawing Sheets

(51) Int. Cl.
*A63F 13/25* (2014.01)
*A63F 13/42* (2014.01)
*A63F 13/837* (2014.01)
*G02B 27/00* (2006.01)
*G06F 3/01* (2006.01)
*G06T 19/00* (2011.01)
*G09G 5/00* (2006.01)
*G09G 5/36* (2006.01)
*G09G 5/377* (2006.01)
*G09G 5/38* (2006.01)

(52) U.S. Cl.
CPC ......... *G02B 27/0093* (2013.01); *G06F 3/017* (2013.01); *A63F 2300/8076* (2013.01); *A63F 2300/8082* (2013.01); *G02B 2027/014* (2013.01)

(56) References Cited

U.S. PATENT DOCUMENTS

| | | | |
|---|---|---|---|
| 2015/0258431 A1* | 9/2015 | Stafford | G06F 3/014 463/31 |
| 2015/0331576 A1* | 11/2015 | Piya | G06F 3/04815 715/850 |
| 2016/0140766 A1* | 5/2016 | Balachandreswaran | G06F 3/005 345/633 |
| 2017/0199584 A1* | 7/2017 | Mallinson | G09G 3/025 |
| 2017/0287222 A1* | 10/2017 | Fujimaki | G06F 3/017 |
| 2017/0329488 A1* | 11/2017 | Welker | G06F 3/011 |
| 2017/0354864 A1* | 12/2017 | Rogers | A63F 13/213 |
| 2019/0262697 A1* | 8/2019 | Kim | A63F 13/42 |
| 2019/0377416 A1* | 12/2019 | Alexander | G06F 3/04815 |
| 2020/0326783 A1* | 10/2020 | Kwon | G06V 10/764 |
| 2020/0357163 A1* | 11/2020 | Wang | G06F 3/04815 |
| 2020/0372716 A1* | 11/2020 | Murata | G06F 3/0304 |
| 2021/0019036 A1* | 1/2021 | Wang | G06F 3/0346 |

* cited by examiner

DISPLAY CONTROL DEVICE, DISPLAY CONTROL METHOD, AND RECORDING MEDIUM

CROSS REFERENCE TO RELATED APPLICATIONS

This application is a U.S. National Phase of International Patent Application No. PCT/JP2021/004597 filed on Feb. 8, 2021, which claims priority benefit of Japanese Patent Application No. JP 2020-024344 filed in the Japan Patent Office on Feb. 17, 2020. Each of the above-referenced applications is hereby incorporated herein by reference in its entirety.

FIELD

The present disclosure relates to a display control device, a display control method, and a recording medium.

BACKGROUND

Conventionally, technology for a user to operate a virtual object without using an input device such as a keyboard or a mouse has been proposed. For example, Patent Literature 1 discloses technology of moving a display position of an operation object (virtual object) in accordance with a change in a position of a hand of a user in a case where a recognized shape of the hand of the user has a predetermined shape.

CITATION LIST

Patent Literature

Patent Literature 1: WO 2014/162762

SUMMARY

Technical Problem

In the above-described related art, in a case where a virtual object is operated with both hands of a user, since the user does not actually hold an object of a size corresponding to the virtual object, an interval between the both hands may easily fluctuate. Therefore, in the related art, it is difficult to localize the virtual object using the positions of the both hands of the user as a reference.

Therefore, the present disclosure proposes a display control device, a display control method, and a recording medium capable of suppressing a sense of incongruity in localization of a virtual object with respect to both hands even when an interval between the both hands of a user changes.

Solution to Problem

To solve the problems described above, a display control device according to an embodiment of the present disclosure includes: an acquisition unit configured to acquire right hand position information indicating a position of a right hand of a user of a head mounted display and left hand position information indicating a position of a left hand of the user; and a display control unit that controls the head mounted display so as to arrange a virtual object having a certain size at the position of the right hand and the position of the left hand on a basis of the right hand position information and the left hand position information, wherein the display control unit controls the head mounted display so as to change a position of the virtual object independently of a change in a distance between the right hand and the left hand while maintaining a display state of the virtual object in which a longitudinal direction of the virtual object that is arranged is parallel to a virtual line connecting the right hand and the left hand.

Moreover, a display control method according to an embodiment of the present disclosure includes the steps of: by a computer, acquiring right hand position information indicating a position of a right hand of a user of a head mounted display and left hand position information indicating a position of a left hand of the user; controlling the head mounted display so as to arrange a virtual object having a certain size at the position of the right hand and the position of the left hand on a basis of the right hand position information and the left hand position information; and controlling the head mounted display so as to change a position of the virtual object independently of a change in a distance between the right hand and the left hand while maintaining a display state of the virtual object in which a longitudinal direction of the virtual object that is arranged is parallel to a virtual line connecting the right hand and the left hand.

Moreover, a computer-readable recording medium according to an embodiment of the present disclosure records a program for causing a computer to implement: acquisition of right hand position information indicating a position of a right hand of a user of a head mounted display and left hand position information indicating a position of a left hand of the user; control of the head mounted display so as to arrange a virtual object having a certain size at the position of the right hand and the position of the left hand on a basis of the right hand position information and the left hand position information; and control of the head mounted display so as to change a position of the virtual object independently of a change in a distance between the right hand and the left hand while maintaining a display state of the virtual object in which a longitudinal direction of the virtual object that is arranged is parallel to a virtual line connecting the right hand and the left hand.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

Embodiments

Configuration of Information Processing Device According to Embodiment

Figure 1:
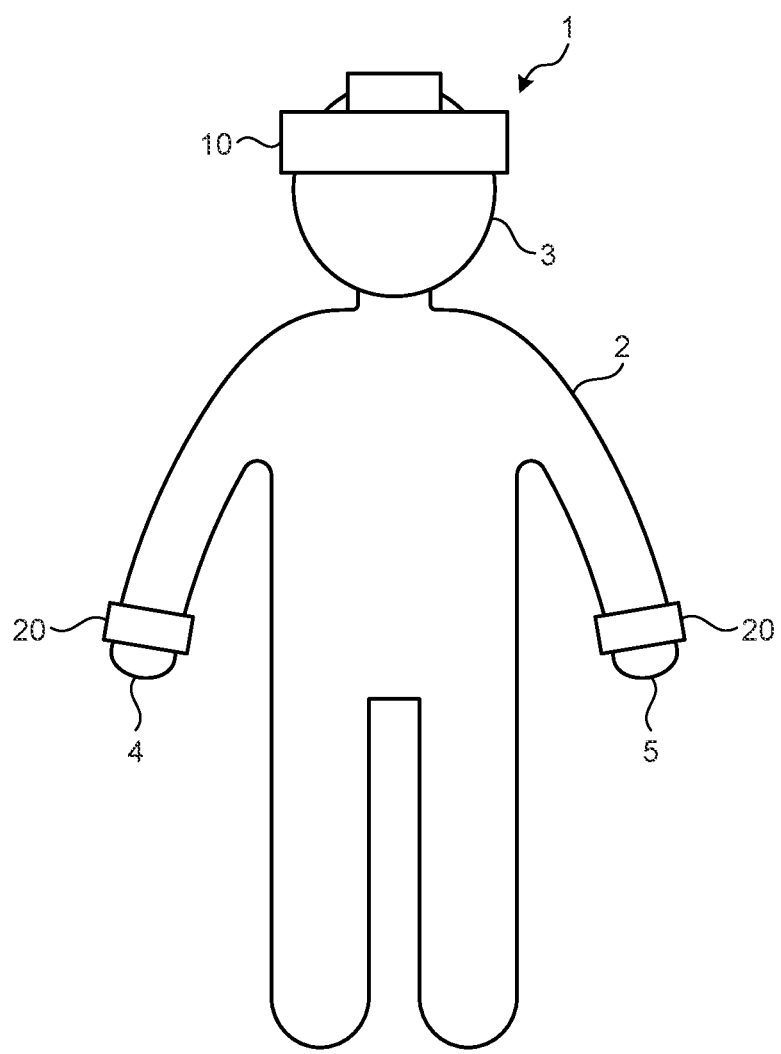
FIG. 1 is a diagram for explaining an example of a system configuration according to an embodiment.
Figure 2:
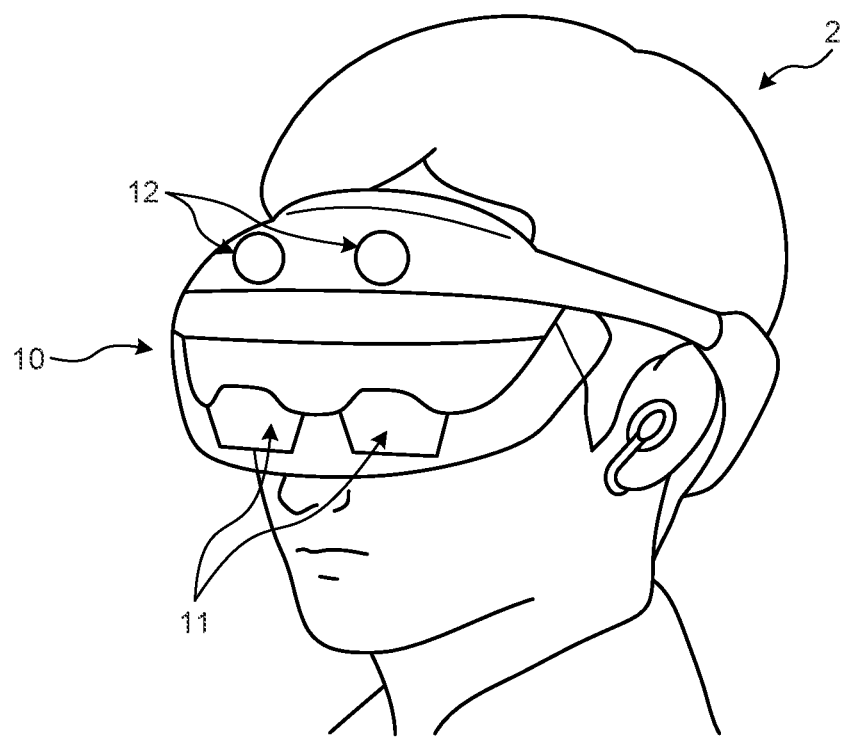
FIG. 2 is a diagram illustrating an example of a head mounted display according to the embodiment.

FIG. 1 is a diagram for explaining an example of a system configuration according to an embodiment. FIG. 2 is a diagram illustrating an example of a head mounted display according to the embodiment. As illustrated in FIG. 1, an augmented reality (AR) glasses system 1 includes a head mounted display (HMD) 10. The HMD 10 includes an AR HMD and a virtual reality (VR) HMD. The AR HMD is a head-mounted wearable device that superimposes a virtual object on an image of a real space. The AR HMD includes an optical see-through scheme and a video see-through scheme. Meanwhile, the VR HMD is a head-mounted wearable device that arranges a virtual object in a virtual space. The HMD 10 according to the present embodiment can be suitably used in an AR HMD in which a shift between a real object and a virtual object is easily recognized. The HMD 10 is worn on a head 3 of a user 2 and displays a generated image on a display in front of the eyes of the user 2.

The AR glasses system 1 further includes wearable devices 20 that detect position information of the hands of the user 2. The wearable devices 20 are examples of a motion sensor. A wearable device 20 includes, for example, a controller, a position sensor unit, and the like. The wearable devices 20 are each worn on one of a right hand 4 and a left hand 5 of the user 2. As the wearable devices 20, a controller held by each of the right hand 4 and the left hand 5 of the user, a glove type controller, or the like may be used. The wearable devices 20 are capable of communicating with the HMD 10 and supply the position information of a detected hand to the HMD. Furthermore, as the motion sensor, for example, an imaging device such as a depth camera or a time of flight (TOF) camera may be used. By using the wearable devices 20 for the motion sensor, it is possible to accurately detect the position information of the hands even in a state where the imaging device cannot image the hands of the user 2.

The AR glasses system 1 determines a response on the basis of the environment understanding of the real space and superimposes and displays a virtual object on an image of the real space in response to the determined response. The understanding of the environment of the real space includes estimation (determination) of the positions of the hands of the user 2 acquired from the motion sensor.

In the example illustrated in FIG. 2, the HMD 10 includes a plurality of displays 11 and a plurality of imaging devices 12. A display area of a display 11 is generally narrower than the angle of view of an imaging device 12. The displays 11 and the imaging devices 12 are arranged in the vicinity of the eyeballs of the user 2. The center of the angle of view of an imaging device 12 and the center of the display area of a display 11 substantially coincide with each other, and a deviation between the centers due to an arrangement error is corrected by calibration.

The AR glasses system 1 implements a display state in which the virtual object is three-dimensionally localized in the real space as viewed from the user 2 by associating the virtual object and the self position with a global coordinate system on the basis of the above-described environment understanding. Note that the self position estimation corresponds to estimation of the position of the device and the posture.

Functions of the HMD 10 such as environment understanding, response determination, and superimposition display are executed by a processor of the HMD 10. At least some of the functions of the HMD 10 may be executed by a separate device such as a smartphone or a cloud server.

Premise of Present Disclosure

Hereinafter, a method for controlling a display position of a virtual object in the present disclosure will be described. The following description is based on the premise that the user 2 is giving an operation instruction to hold the virtual object with both hands by a gesture operation or an input operation to the wearable devices 20. It should be noted that, for example, when the user 2 stops an operation instruction to hold with both hands, the virtual object moves away from at least one of the hands of the user 2 depending on a physical operation result defined for the AR content.

Furthermore, in the following description, a virtual object to be held with both hands, such as a weapon, related game content is presumed; however, the invention of the present disclosure is not limited thereto. A virtual object in the invention of the present disclosure is only required to be an object having a predetermined size or more. More specifically, the virtual object in the present disclosure may be deemed as having such a size that at least one end in the longitudinal direction of the virtual object extrudes outside the display area in a state where the user 2 directly or indirectly holds the virtual object with both hands and distances the both hands from the user 2 by greater than or equal to 10 cm.

For example, in a case where a virtual object having a fixed size (such as the length or the width) to be operated by the user 2 with the both hands is displayed, in some cases it is difficult for the AR glasses system 1 to localize the virtual object. The virtual object includes, for example, a virtual object such as a rifle or a bow. Therefore, in the present embodiment, the HMD 10 and the like that can suppress the sense of incongruity in the virtual object with respect to the both hands even if the interval between the both hands of the user 2 changes are provided.

Configuration Example of AR Glasses System According to Embodiment

Figure 3:
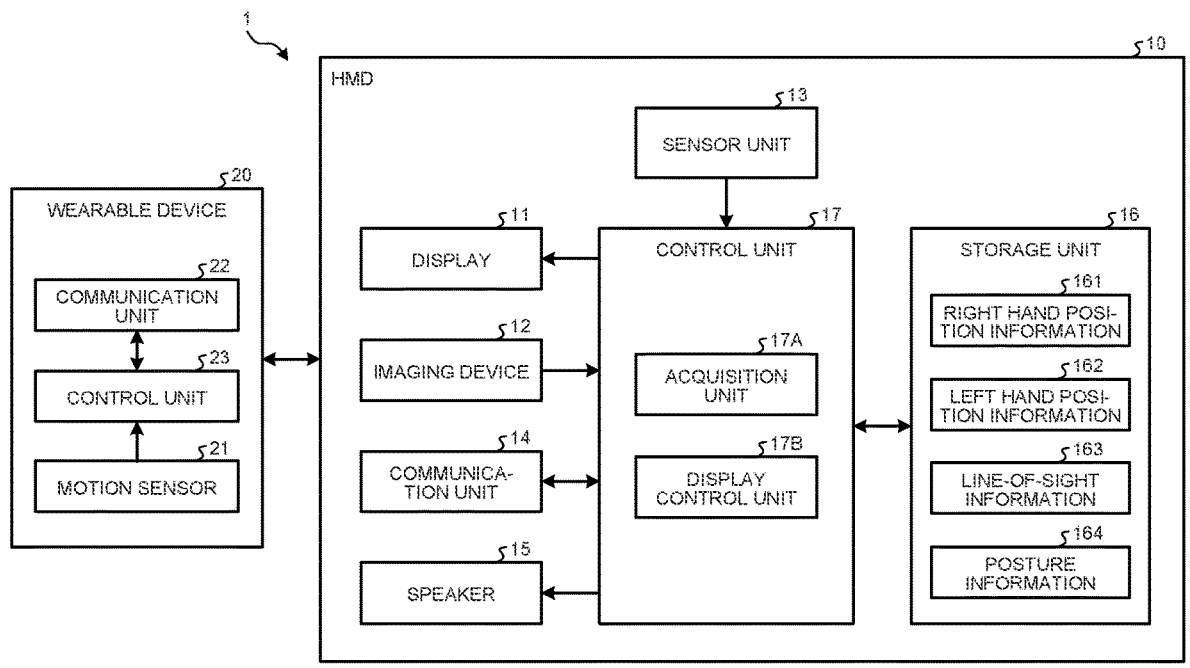
FIG. 3 is a diagram for explaining an example of a configuration of an AR glasses system according to the embodiment.
Figure 4:
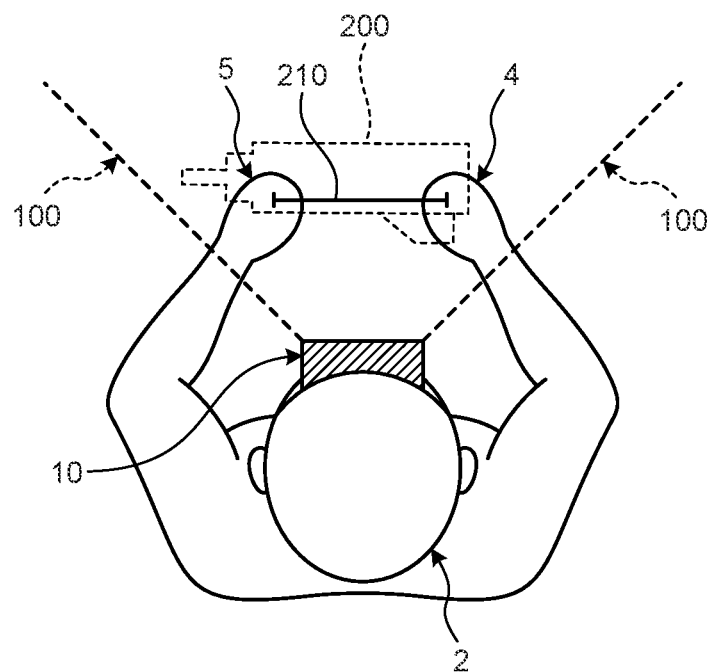
FIG. 4 is a diagram illustrating an example of a relationship between a superimposition area of the head mounted display and a virtual object.

Next, a configuration example of the AR glasses system 1 according to the embodiment will be described. FIG. 3 is a diagram for explaining an example of a configuration of the AR glasses system 1 according to the embodiment. FIG. 4 is a diagram illustrating an example of a relationship between a superimposition area of the head mounted display 10 and a virtual object 200.

Configuration Example of Wearable Device

As illustrated in FIG. 3, a wearable device 20 includes a motion sensor 21, a communication unit 22, and a control unit 23. The control unit 23 is electrically connected with the motion sensor 21 and the communication unit 22.

The motion sensor 21 senses the state or the like of the user 2 and supplies the sensed sensor information to the control unit 23. The motion sensor 21 includes, for example, a plurality of sensors such as an inertial measurement unit (IMU) and an azimuth sensor. The IMU senses the motion of the user 2. The IMU includes, for example, a three-axis gyro sensor and a three-axis acceleration sensor and supplies sensor information, which has been detected, indicating the three-dimensional angular velocity, acceleration, and the like to the control unit 23. The azimuth sensor senses the direction (orientation) of the hand of the user 2. The azimuth sensor includes, for example, a geomagnetic sensor and supplies sensor information indicating the detected direction of the hand of the user 2 to the control unit 23.

The communication unit 22 communicates with, for example, the HMD 10 or the like. The communication unit 22 transmits and receives various types of data via, for example, a wired or wireless network. The communication unit 22 transmits the sensor information to the HMD 10. The communication unit 22 supplies, for example, various types of data received from the HMD 10 to the control unit 23.

The control unit 23 controls the wearable devices 20. The control unit 23 controls the motion sensor 21, the communication unit 22, and the like. The control unit 23 performs control of transmitting sensor information indicating a detection result of the motion sensor 21 to the HMD 10.

The functional configuration example of the wearable devices 20 according to the present embodiment has been described above. Note that the configuration described above by referring to FIG. 3 is merely an example, and the functional configuration of the wearable devices 20 according to the present embodiment is not limited to such an example. The functional configuration of the wearable devices 20 according to the present embodiment can be flexibly modified depending on specifications or the use.

Configuration Example of Head Mounted Display

As illustrated in FIG. 3, the HMD 10 includes the displays 11, the imaging devices 12, a sensor unit 13, a communication unit 14, a speaker 15, a storage unit 16, and a control unit 17. The control unit 17 is electrically connected with the displays 11, the imaging devices 12, the sensor unit 13, the communication unit 14, the speaker 15, and the storage unit 16.

A display 11 includes, for example, a see-through display, a liquid crystal display (LCD), an organic electro-luminescence display (OELD), and the like. The displays 11 display various types of information under the control of the control unit 17. The various types of information include, for example, a virtual object having a certain size. The virtual object having a fixed size includes, for example, a virtual object having a fixed size, a virtual object deformable into a plurality of different sizes, a virtual object that is deformable, and the like. For example, the displays 11 each display an image corresponding to one of the eyes of the user U when the HMD 10 is worn, thereby implementing three-dimensional display using parallax of the both eyes. Thereby the displays 11 three-dimensionally display the virtual object.

An imaging device 12 acquires information for estimating the line-of-sight direction of the user 2. The imaging device 12 has a function of imaging a still image or a moving image by forming an image on an imaging element such as a charge coupled device (CCD) or a complementary metal oxide semiconductor (CMOS). The imaging device 12 includes, for example, an outward camera and an inward camera. The outward camera captures, for example, an image of the real space inside the angle of view and supplies the captured image information to the control unit 17. The inward camera, for example, supplies image information capturing an image of the eye of the user 2 to the control unit 17.

The sensor unit 13 senses the state of the user 2, the surrounding situation, and the like, and supplies the sensed sensor information to the control unit 17. The sensor unit 13 includes, for example, a plurality of sensors such as a microphone, an inertial measurement unit (IMU), and an azimuth sensor. The microphone collects voice of the user 2 or the surrounding sound (such as the environmental sound) and supplies collected sound information to the control unit 17. The IMU senses the motion of the user 2. The IMU includes, for example, a three-axis gyro sensor and a three-axis acceleration sensor and supplies sensor information, which has been detected and indicates the three-dimensional angular velocity, acceleration, and the like, to the control unit 17. The azimuth sensor senses the direction (orientation) of the HMD 10. The azimuth sensor includes, for example, a geomagnetic sensor and supplies the sensor information indicating the detected direction of the HMD 10 to the control unit 17.

The communication unit 14 is electrically connected with an external electronic device such as the wearable devices 20 in a wired or wireless manner and transmits and receives data. The communication unit 14 is communicably connected to an electronic device outside the HMD 10 by, for example, a wired/wireless local area network (LAN), Wi-Fi (registered trademark), Bluetooth (registered trademark), or the like. The communication unit 14 supplies the received information to the control unit 17. The communication unit 14 transmits information instructed by the control unit 17 to a corresponding electronic device.

The speaker 15 is configured as, for example, a headphone worn on the head of the user 2 who is wearing the HMD 10 and reproduces an audio signal under the control of the control unit 17. Alternatively, the speaker 15 is not limited to the headphone type and may be configured as an earpiece or a bone conduction speaker.

The storage unit 16 stores various types of data and various programs. For example, the storage unit 16 can store various types of information from the imaging device 12, the sensor unit 13, the communication unit 14, and the like. The storage unit 16 is, for example, a random access memory (RAM), a semiconductor memory element such as a flash memory, a hard disk, an optical disk, or the like. Note that the storage unit 16 may be included in a server, an electronic device, or the like connected to the HMD 10 via a network. In the present embodiment, the storage unit 16 is an example of a recording medium.

The storage unit 16 stores, for example, right hand position information 161, left hand position information 162, line-of-sight information 163, posture information 164, and the like. The right hand position information 161 includes, for example, information indicating the position of the right hand 4 of the user 2. The right hand position information 161 includes, for example, information indicating the position of the left hand 5 of the user 2. The right hand position information 161 and the left hand position information 162 are managed in association with local coordinates based on the position of the HMD 10 or global coordinates with respect to the real space acquired by a simultaneous localization and mapping (SLAM) technology. The line-of-sight information 163 includes, for example, information indicating the line-of-sight direction of the user 2. The posture information 164 includes, for example, information indicating the posture, the orientation, the shape, and the like of the user 2.

The control unit 17 controls the HMD 10. The control unit 17 is implemented by, for example, a central processing unit (CPU), a micro control unit (MCU), or the like. Furthermore, the control unit 17 may be implemented by, for example, an integrated circuit such as an application specific integrated circuit (ASIC) or a field programmable gate array (FPGA). The control unit 17 may include a read only memory (ROM) that stores programs, operation parameters, and the like to be used and a RAM that temporarily stores parameters and the like that change as appropriate. In the present embodiment, the control unit 17 is an example of a display control device.

The control unit 17 includes functional units such as an acquisition unit 17A and a display control unit 17B. The functions of the control unit 17 are implemented, for example, when the control unit 17 executes a program stored inside the HMD 10 using a RAM or the like as a work area.

The acquisition unit 17A acquires the right hand position information 161 indicating the position of the right hand 4 of the user 2 of the HMD 10 and the left hand position information 162 indicating the position of the left hand 5 of the user 2. The acquisition unit 17A acquires, for example, the right hand position information 161 indicating the position of the right hand 4 of the user 2 of the HMD 10 and the left hand position information 162 indicating the position of the left hand 5 of the user 2 from the motion sensors 21 of the wearable devices 20. For example, the acquisition unit 17A acquires the right hand position information 161 and the left hand position information 162 by image recognition on the basis of image information of the imaging device 12. Alternatively, the acquisition unit 17A may acquire, for example, the position indicated by sensor information of the wearable device 20 worn on the right hand 4 of the user 2 as the right hand position information 161 via the communication unit 14. In this case, the acquisition unit 17A acquires the position indicated by the sensor information of the wearable device 20 worn on the left hand 5 of the user 2 as the left hand position information 162 via the communication unit 14. Then, the acquisition unit 17A stores the right hand position information 161 and the left hand position information 162 that have been acquired in the storage unit 16.

The acquisition unit 17A acquires the line-of-sight direction of the user 2. The acquisition unit 17A estimates the line of sight of the user U using, for example, a known line-of-sight estimation method. For example, the acquisition unit 17A uses a light source and a camera in a case where the line of sight is estimated by the pupil center corneal reflection method. In the present embodiment, the acquisition unit 17A acquires image information from the imaging device 12 of the HMD 10. The image information obtained by imaging the eye of the user 2 by the imaging device 12 is analyzed, a bright spot or a pupil is detected, and bright spot related information including information related to the position of the bright spot and pupil related information including information related to the position of the pupil are generated. The acquisition unit 17A estimates the line-of-sight direction of the user 2 on the basis of the bright spot related information, the pupil related information, and the like. The acquisition unit 17A acquires the line-of-sight information 163 indicating the estimated line-of-sight direction and stores the line-of-sight information in the storage unit 16.

As illustrated in FIG. 4, the display control unit 17B controls the HMD 10 so as to arrange the virtual object 200 having a certain size at the position of the right hand 4 and the position of the left hand 5 on the basis of the right hand position information 161 and the left hand position information 162. The display control unit 17B performs control to display the virtual object 200 on the displays 11 on the basis of information for displaying the virtual object 200. The display control unit 17B controls the display of the HMD 10 so as to be superimposed on the positions of the hands of the user 2 inside a superimposition area 100 of the HMD 10. The superimposition area 100 may be, for example, display areas of the displays 11 or an area of the angles of view of the imaging devices 12. For example, the display areas of the displays 11 are a rectangular area and is an area narrower than the viewing angle of the user 2. Controlling the HMD 10 includes, for example, displaying the virtual object 200 on the displays 11, outputting sound from the speaker 15, and the like. In the example illustrated in FIG. 4, the superimposition area 100 is an area surrounded by two broken lines.

The display control unit 17B controls the HMD 10 so as to change the position of the virtual object 200 independently of a change in the distance between the right hand 4 and the left hand 5 while maintaining the display state of the virtual object 200 in which the longitudinal direction of the arranged virtual object 200 is parallel to a virtual line 210 connecting the right hand 4 and the left hand 5. That is, the display control unit 17B does not change the position of the virtual object 200 even when the distance between the right hand 4 and the left hand 5 of the user 2 changes.

The virtual line 210 is set as a line segment having both ends with one of the ends at one hand of the user 2 and another end at the other hand. The virtual object 200 is arranged (displayed) in the superimposition area 100 so that the longitudinal direction is parallel to the virtual line 210. The virtual object 200 has a substantially fixed size. The virtual object 200 is not limited to a completely rigid body and also includes a virtual object that is flexible like a bow. In other words, the "virtual object having a substantially fixed size" may be deemed as the virtual object 200 whose size is generally recognized by the user 2 as being unchanging if the virtual object 200 were a real object. Alternatively, the "virtual object having a substantially fixed size" may be deemed as an object having a deformation amount that is less than or equal to a predetermined value. On the other hand, objects not included in the "virtual object having a fixed size" may include an elastic body having a deformation rate that is greater than or equal to a predetermined value (such as a rubber band that can be stretched to basically any size), an amorphous fluid object, or a gel-like object.

The display control unit 17B has a function of controlling the HMD 10 so as to change the position of the virtual object 200 independently of a change in the distance between the right hand 4 and the left hand 5 on the basis of a change in the line-of-sight direction of the user 2. The display control unit 17B determines a superimposition position of the virtual object 200 with respect to at least one of the right hand 4 or the left hand 5 on the basis of an intersection of a line extending in the line-of-sight direction and the virtual line 210.

Figure 5:
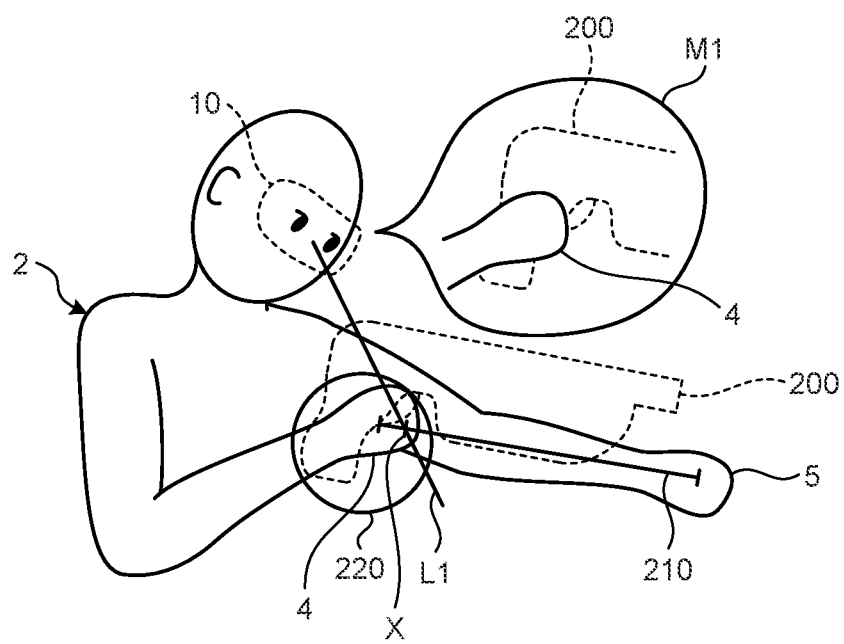
FIG. 5 is a diagram for explaining a display example of the head mounted display.
Figure 6:
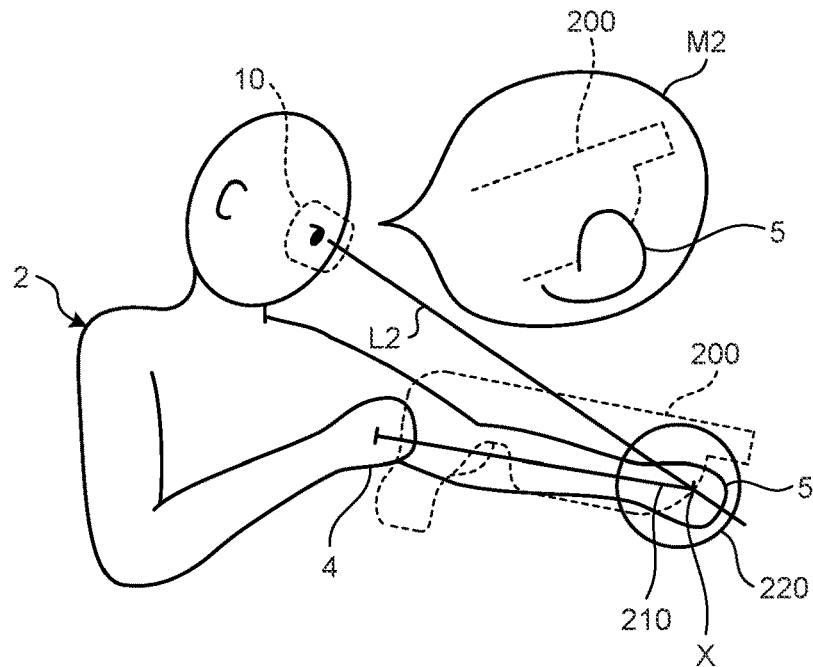
FIG. 6 is a diagram for explaining another display example of the head mounted display.
Figure 7:
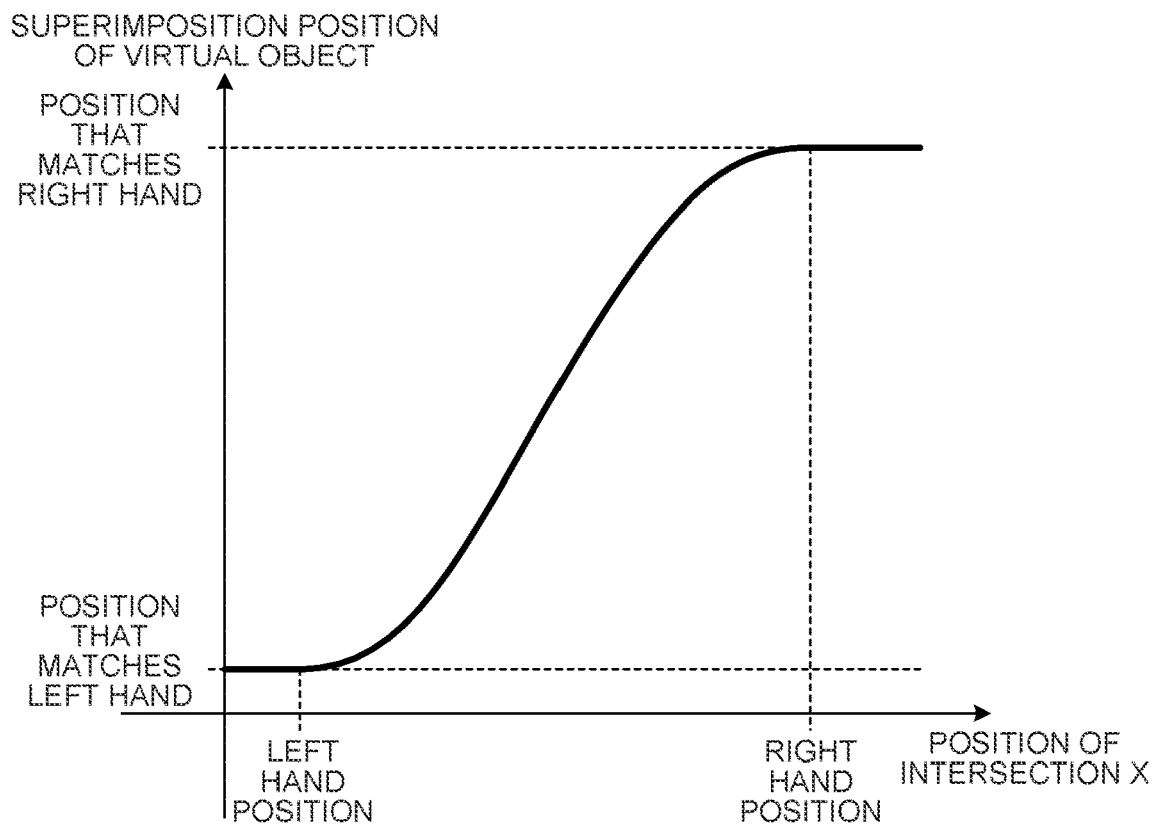
FIG. 7 is a graph illustrating an example of a relationship between the superimposition position of a virtual object and the positions of the hands of a user.

FIG. 5 is a diagram for explaining a display example of the head mounted display 10. FIG. 6 is a diagram for explaining another display example of the head mounted display 10. FIG. 7 is a graph illustrating an example of a relationship between the superimposition position of the virtual object 200 and the positions of the hands of the user 2.

In the example illustrated in FIG. 5, the user 2 directs a line of sight L1 toward the right hand 4 positioned inside the superimposition area 100 of the HMD 10 and positions the left hand 5 outside the superimposition area 100. In this case, the display control unit 17B estimates the position of an intersection X of the line of sight L1 and the virtual line 210 and determines the superimposition position of the virtual object 200 depending on the distance between the intersection X and the right hand 4 of the user 2 that is close to the line of sight L1. For example, the display control unit 17B performs display control to change the display position of the virtual object 200 so that an end of the virtual object 200 overlaps more with the position of the right hand 4 as the distance between the right hand 4 of the user 2 and the intersection X decreases. That is, the display control unit 17B controls the display of the HMD 10 so that the end of the virtual object 200 is fixed to the right hand 4 inside the superimposition area 100 even when the position of the left hand 5 of the user 2 changes and the interval between the left and right hands changes. On the other hand, the display control unit 17B, the other end of the virtual object 200 is not fixed at the position of the left hand 5 that is outside the superimposition area 100. As a result, as illustrated in a display example M1, the HMD 10 can cause the user 2 to visually recognize that the end of the virtual object 200 is stably arranged on the right hand 4 that is inside the superimposition area 100. Note that, in the present embodiment, the end of the virtual object 200 includes, for example, a portion as a grip of the virtual object 200, a physical end, and the like.

In the example illustrated in FIG. 6, the user 2 directs a line of sight L2 toward the left hand 5 positioned inside the superimposition area 100 of the HMD 10 and positions the right hand 4 outside the superimposition area 100. In this case, the display control unit 17B estimates the position of an intersection X of the line of sight L2 and the virtual line 210 and determines the superimposition position of the virtual object 200 depending on the distance between the intersection X and the left hand 5 of the user 2 that is close to the line of sight L2. For example, the display control unit 17B performs display control to change the display position of the virtual object 200 so that an end of the virtual object 200 overlaps more with the position of the left hand 5 as the distance between the left hand 5 of the user 2 and the intersection X decreases. That is, the display control unit 17B controls the display of the HMD 10 so that the end of the virtual object 200 is fixed to the left hand 5 inside the superimposition area 100 even when the position of the right hand 4 of the user 2 changes and the interval between the left and right hands changes. On the other hand, the display control unit 17B, the other end of the virtual object 200 is not fixed at the position of the right hand 4 that is outside the superimposition area 100. As a result, as illustrated in a display example M2, the HMD 10 can cause the user 2 to visually recognize that the end of the virtual object 200 is stably arranged on the left hand 5 that is inside the superimposition area 100.

The display control unit 17B uses a calculation method for causing the user 2 to visually recognize the virtual object 200 is stably arranged without depending on the distance between the both hands. As the calculation method, for example, a calculation formula based on the graph illustrated in FIG. 7 is used. In the graph illustrated in FIG. 7, the vertical axis represents the superimposition position of the virtual object 200, and the horizontal axis represents the position of the intersection X. The graph illustrated in FIG. 7 defines a position at which the superimposition position of the virtual object 200 overlaps the right hand 4 when the position of the intersection X overlaps the position of the right hand 4 of the user 2. The graph illustrated in FIG. 7 defines a position where the superimposition position of the virtual object 200 is shifted from the right hand 4 as the position of the intersection X moves away from the position of the right hand 4 of the user 2. The graph illustrated in FIG. 7 defines a position where the superimposition position of the virtual object 200 overlaps the left hand 5 when the position of the intersection X overlaps the position of the left hand 5 of the user 2. The HMD 10 stores information for executing the above-described calculation method in, for example, the storage unit 16, an accessible external storage device, or the like. The display control unit 17B calculates the superimposition position of the virtual object 200 from the position of the intersection X using the calculation method.

When the right hand 4 and the left hand 5 of the user 2 are positioned outside the superimposition area 100 and the virtual line 210 is positioned inside the superimposition area 100, the display control unit 17B determines the superimposition position of the virtual object 200 by referring to the position of the intersection X of the virtual line 210. For example, the display control unit 17B determines the superimposition position of the virtual object 200 that passes through the intersection X and is parallel to the virtual line 210. The display control unit 17B controls the display of the displays 11 so that the virtual object 200 is arranged at the determined superimposition position. As a result, the HMD 10 can suppress the sense of incongruity in the display of the virtual object 200 even when the both hands of the user 2 are outside the superimposition area 100.

Figure 8:
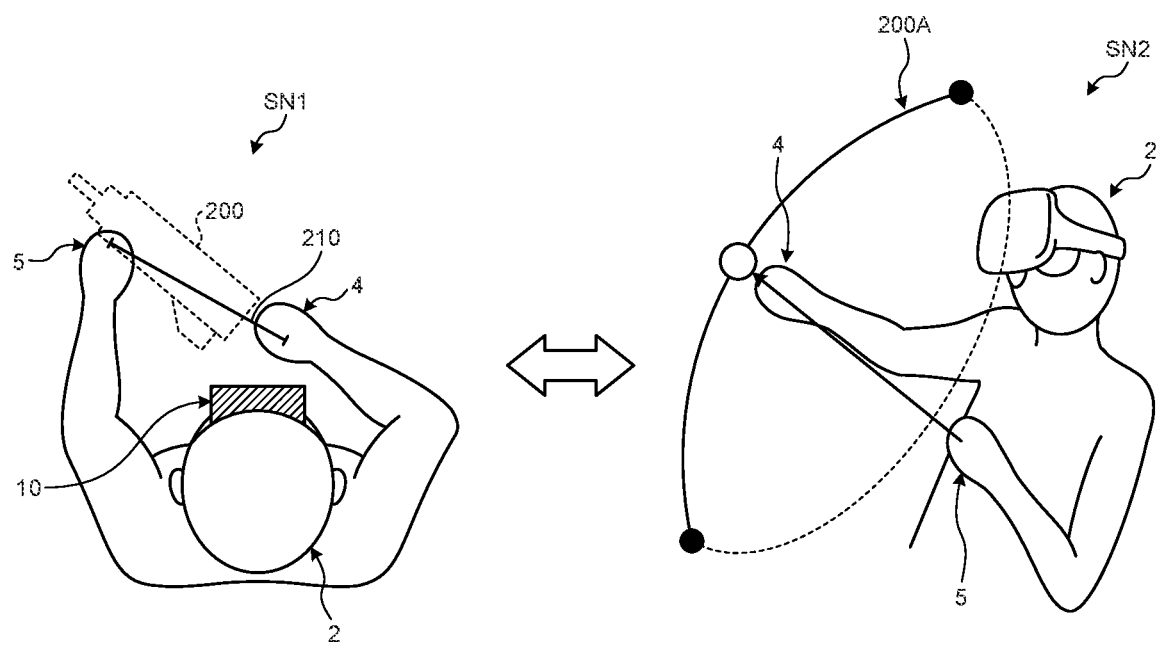
FIG. 8 is a diagram illustrating another example of the relationship between the superimposition position of a virtual object and the positions of the hands of a user.

FIG. 8 is a graph illustrating another example of a relationship between the superimposition position of the virtual object 200 and the positions of the hands of the user 2. Examples of the virtual object 200 according to the present embodiment include a weapon object in a first-person viewpoint game as illustrated in FIG. 8. Examples of the weapon object include a firearm illustrated in a scene SN1 and an object such as a bow and arrow illustrated in a scene SN2. These objects are operation objects for pointing at a far point. Therefore, in a case where the user 2 uses these objects, basically, the user 2 operates the objects so that a distal hand falls within the angle of view as viewed from the user 2.

In the visual field of the user 2, that is, inside the superimposition area 100 of the HMD 10, the longitudinal direction of the virtual object 200 changes depending on the inclination of the virtual line 210. Therefore, in a case where any one of the hands of the user 2 is included inside the superimposition area 100, the display control unit 17B slides an end of the virtual object 200 on the virtual line 210 and superimposes the end of the virtual object 200 at the position of the hand of the user 2.

For example, in the scene SN1, the user 2 visually recognizes the direction of the point of the virtual object 200. In this case, the display control unit 17B recognizes that the left hand 5, which is on the far side from the user 2 with respect to the right hand 4, is positioned inside the superimposition area 100 and slides the virtual object 200 on the virtual line 210 so that the end of the virtual object 200 is positioned at a position superimposed on the left hand 5.

For example, in the scene SN2, the user 2 visually recognizes the vicinity of the center of the bow as the virtual object 200 held by the right hand 4. In this case, the display control unit 17B recognizes that the right hand 4, which is on the far side from the user 2 with respect to the left hand 5, is positioned inside the superimposition area 100 and slides the virtual object 200 on the virtual line 210 so that the end of the virtual object 200 is positioned at a position superimposed on the right hand 4.

According to the present embodiment, since the position of the virtual object 200 slides smoothly on the virtual line 210 in the process of a pointing operation by the user 2, the HMD 10 can reduce the sense of incongruity in the display of the virtual object 200 with respect to a change in the interval between the both hands of the user 2.

The functional configuration example of the HMD 10 included in the AR glasses system 1 according to the present embodiment has been described above. Note that the configuration described above by referring to FIG. 3 is merely an example, and the functional configuration of the HMD 10 according to the present embodiment is not limited to such an example. The functional configuration of the HMD 10 according to the present embodiment can be flexibly modified depending on specifications or the use.

Exception Processing Related to Display Control of Head Mounted Display

Figure 9:
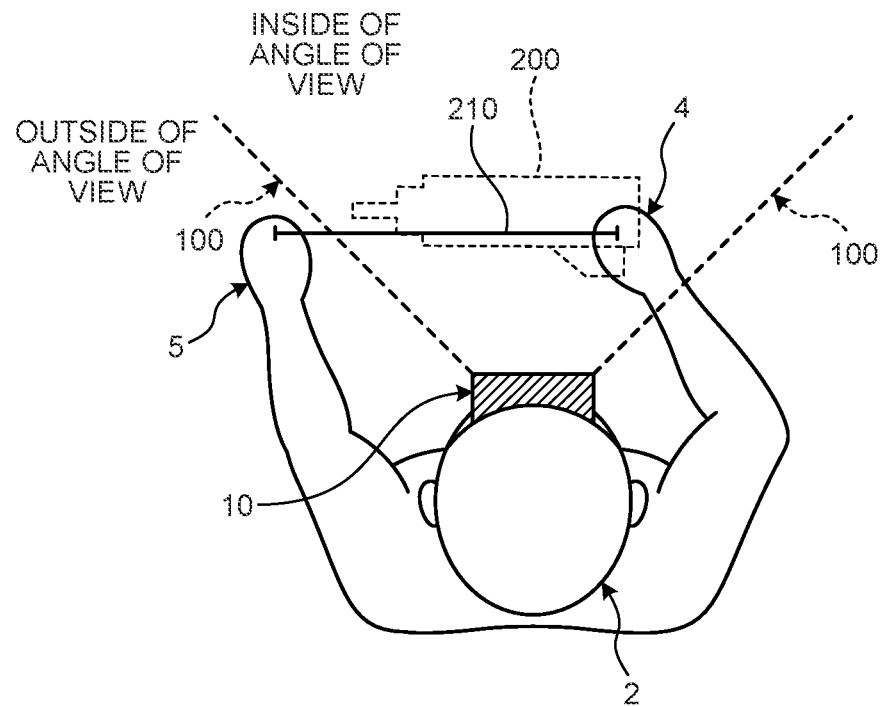
FIG. 9 is a diagram for explaining an example of first exception processing of the head mounted display.
Figure 10:
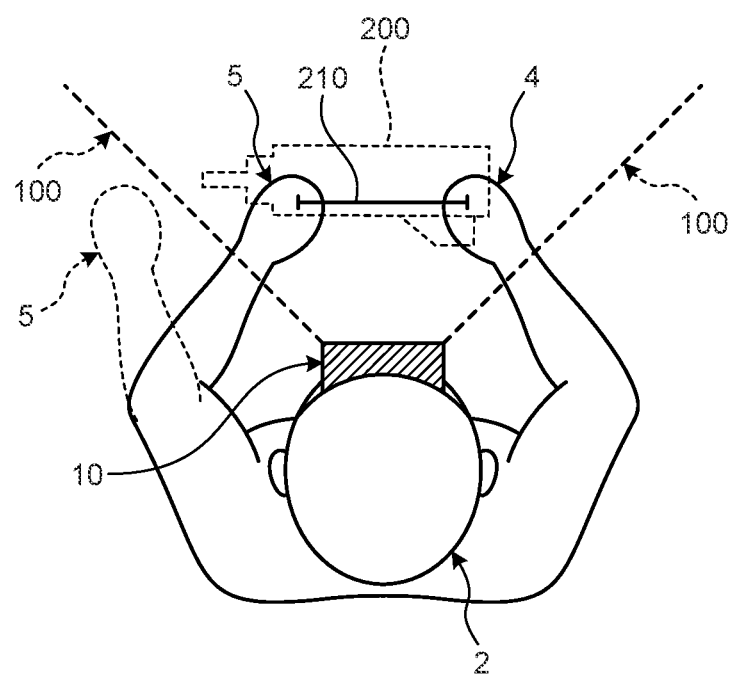
FIG. 10 is a diagram for explaining an example of second exception processing of the head mounted display.

FIG. 9 is a diagram for explaining an example of first exception processing of the head mounted display 10. FIG. 10 is a diagram for explaining an example of second exception processing of the head mounted display 10. The HMD 10 has a function of executing the first exception processing as exception processing in a case where position information of any one of the hands cannot be acquired and the second exception processing as exception processing in a case where the entire virtual object 200 is inside the superimposition area 100, and other processing.

First Exception Processing

For example, in the case of sensing by the imaging devices 12, the angle of view (for example, a diagonal angle of about 70 degrees) of the imaging devices 12 installed to the HMD 10 generally have a limit. Therefore, there are cases where one hand is not included in the angles of view depending on a change in the line-of-sight direction of the user 2, and position information of the hand cannot be accurately acquired. For example, in an example illustrated in FIG. 9, since the left hand 5 of the user 2 is outside the angle of view, the HMD 10 cannot acquire position information of the left hand 5 and cannot set the virtual line 210 from position information of the both hands.

The acquisition unit 17A cannot acquire the position information of the one hand of the user 2 from the image information of the imaging devices 12, and the display control unit 17B recognizes that the other hand of the user 2 is positioned inside the superimposition area 100. The display control unit 17B sets the longitudinal direction of the virtual object 200 on the basis of posture information of the other hand acquired by the acquisition unit 17A, the line-of-sight direction, the type and the shape of the virtual object 200, and the like. In this case, the display control unit 17B controls the HMD 10 so that the end of the virtual object 200 is superimposed on the other hand of the user 2. The display control unit 17B controls the HMD 10 so as to change the longitudinal direction of the virtual object 200 on the basis of a change in the posture of the one hand of the user 2 positioned inside the superimposition area 100. In the example illustrated in FIG. 9, the display control unit 17B displays the virtual object 200 on the displays 11 so that the end of the virtual object 200 is superimposed on the right hand 4 of the user and that the longitudinal direction of the virtual object 200 is directed in a direction corresponding to the posture of the right hand 4.

Second Exception Processing

For example, in a case where the entire virtual object 200 is included inside the superimposition area 100, if the virtual object 200 is slid in accordance with the interval between the both hands of the user 2 as described above, this may disadvantageously give a sense of incongruity to the user 2. Therefore, in the second exception processing, even in a case where the virtual line 210 can be set on the basis of the position information of the both hands, the position or the posture of the virtual object 200 is changed depending on the position or the posture of the one hand inside the superimposition area 100 (for example, the angle of view), and a change in the position or the posture of the other hand is ignored. That is, the second exception processing is exceptional processing in a case where the entire virtual object 200 to be operated is displayed.

The display control unit 17B controls the HMD 10 so as to change the position of the virtual object 200 in accordance with at least one of the position or the posture of the one hand of the user 2 positioned inside the superimposition area 100 of the HMD 10. The display control unit 17B ignores a change in the position or the posture of the other hand of the user 2 that is different from the one hand. For example, in a case where a hand suitable for holding is set for the virtual object 200, the display control unit 17B sets the hand suitable for holding as the one hand. For example, in a case where a hand required for operation of the virtual object 200 is set, the display control unit 17B sets the hand other than the hand required for the operation of the virtual object 200 as the one hand. The hand required for the operation means, for example, a hand whose position changes depending on the operation on the virtual object 200. In the example illustrated in FIG. 10, the right hand 4 is set as a hand suitable for holding the virtual object 200. In this case, the display control unit 17B displays the virtual object 200 on the displays 11 so that an end of the virtual object 200 is superimposed on the right hand 4 of the user and that the longitudinal direction of the virtual object 200 is parallel to the virtual line 210. As a result, since the display of the virtual object 200 does not change even if the user 2 changes the position or the posture of the left hand 5, it is possible to suppress the sense of incongruity in the display of the virtual object 200.

Note that the HMD 10 may combine the first exception processing and the second exception processing described above. The HMD 10 may combine at least one of the first exception processing or the second exception processing with basic display control processing.

[Processing Procedure of Head Mounted Display 10 According to Embodiment]

Figure 11:
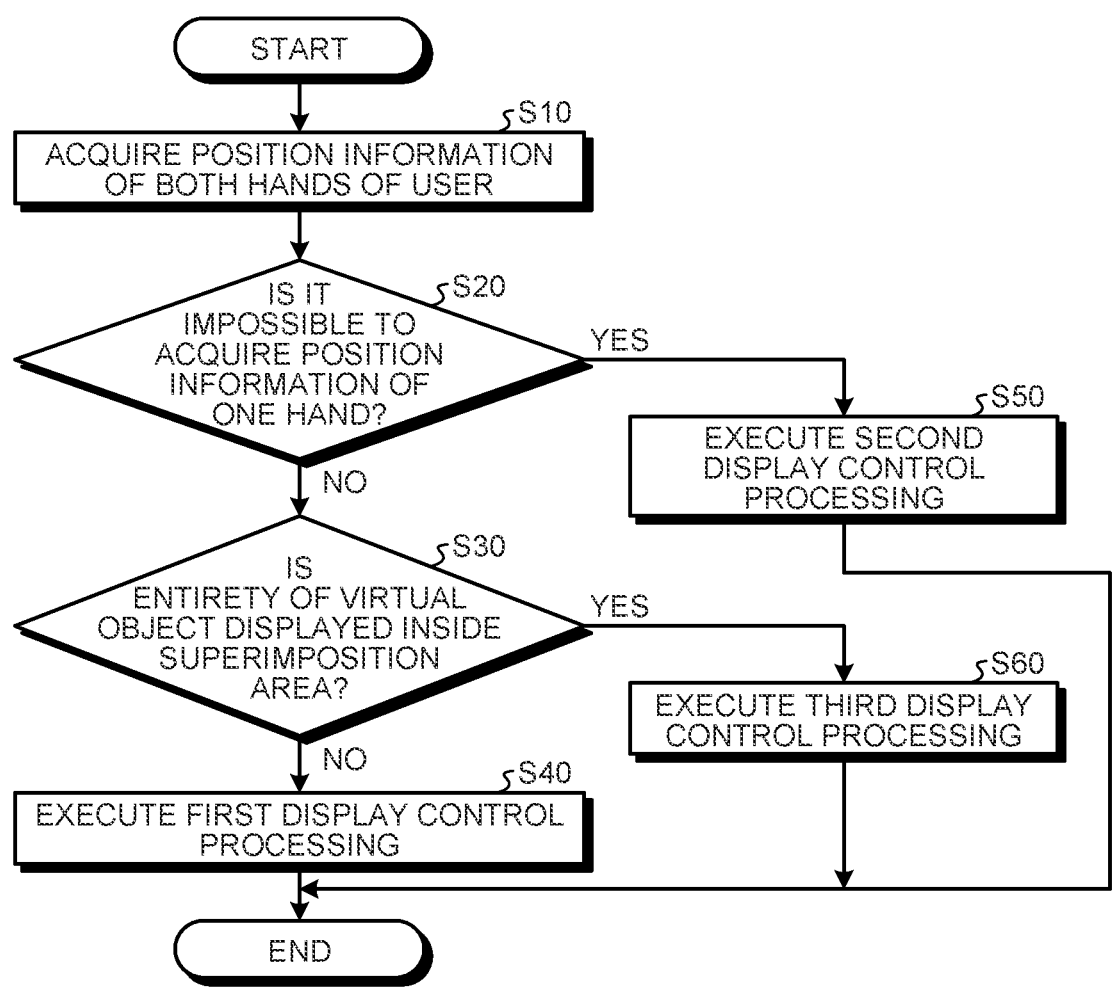
FIG. 11 is a flowchart illustrating an example of a processing procedure executed by the head mounted display according to the embodiment.
Figure 12:
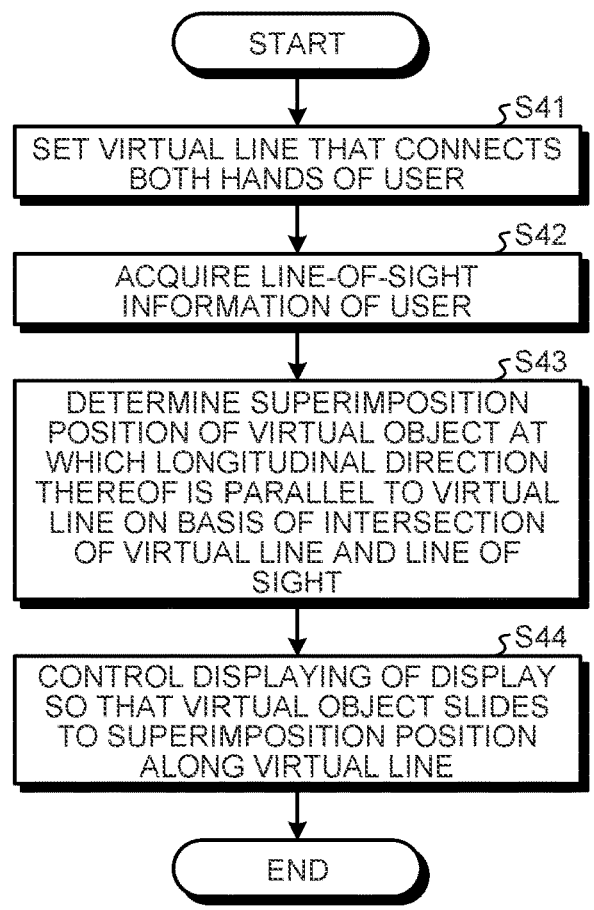
FIG. 12 is a flowchart illustrating an example of first display control processing illustrated in FIG. 11.
Figure 13:
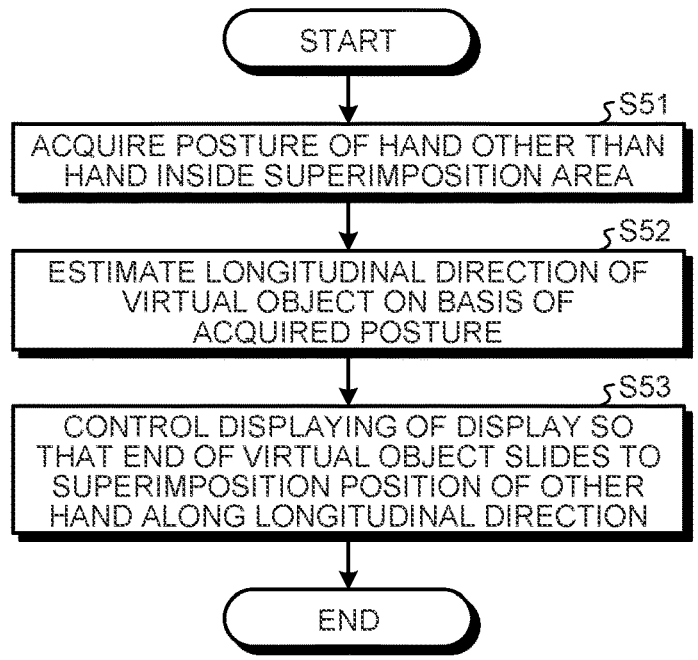
FIG. 13 is a flowchart illustrating an example of second display control processing illustrated in FIG. 11.
Figure 14:
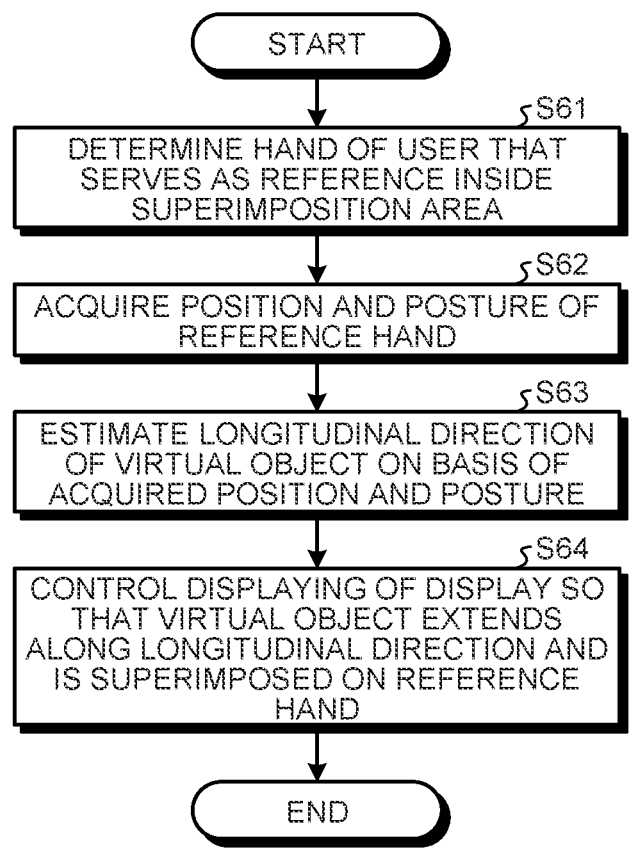
FIG. 14 is a flowchart illustrating an example of third display control processing illustrated in FIG. 11.

Next, an example of a processing procedure of the head mounted display 10 according to the embodiment will be described. FIG. 11 is a flowchart illustrating an example of a processing procedure executed by the head mounted display 10 according to the embodiment. FIG. 12 is a flowchart illustrating an example of first display control processing illustrated in FIG. 11. FIG. 13 is a flowchart illustrating an example of second display control processing illustrated in FIG. 11. FIG. 14 is a flowchart illustrating an example of third display control processing illustrated in FIG. 11. Note that the processing procedure illustrated in FIG. 11 is implemented by the control unit 17 of the HMD 10 executing a program. The processing procedure illustrated in FIG. 11 is repeatedly executed by the control unit 17 of the HMD 10 in a case where the virtual object 200 is displayed on the display 11.

As illustrated in FIG. 11, the control unit 17 of the HMD 10 acquires position information of the both hands of the user 2 (step S10). For example, the control unit 17 acquires the right hand position information 161 and the left hand position information 162 via the wearable devices 20. For example, the control unit 17 acquires the right hand position information 161 and the left hand position information 162 on the basis of image information of the imaging devices 12. The control unit 17 stores the acquired position information in the storage unit 16. The control unit 17 functions as the acquisition unit 17A by executing the processing of step S10. When the processing of step S10 is completed, the control unit 17 advances the processing to step S20.

The control unit 17 determines whether or not the position information of one hand cannot be acquired (step S20). For example, in a case where the right hand position information 161 or the left hand position information 162 is not stored in the storage unit 16, the control unit 17 determines that position information of one hand cannot be acquired. If it is determined that position information of one hand cannot be acquired (No in step S20), the control unit 17 proceeds the processing step S30 since position information of the both hands of the user 2 has been acquired.

The control unit 17 determines whether or not the entire virtual object 200 is displayed inside the superimposition area 100 (step S30). If it is determined that the virtual object 200 is not displayed inside the superimposition area 100 (No in step S30), the control unit 17 advances the processing to step S40.

The control unit 17 executes the first display control processing (step S40). The first display control processing is, for example, processing of controlling the display of the displays 11 so as to superimpose the virtual object 200 on the positions of the hands of the user 2 on the basis of the position information of the both hands of the user 2 and the virtual line 210 connecting the both hands. The first display control processing includes, for example, the processing procedure illustrated in FIG. 12.

As illustrated in FIG. 12, the control unit 17 sets the virtual line 210 connecting the both hands of the user 2 (step S41). For example, the control unit 17 sets the virtual line 210 connecting the position indicated by the right hand position information 161 and the position indicated by the left hand position information 162. Then, the control unit 17 acquires line-of-sight information of the user 2 (step S42). For example, the control unit 17 estimates the line-of-sight direction of the user 2 on the basis of the image information of the imaging devices 12 and acquires the line-of-sight information 163 indicating the line-of-sight direction that has been estimated. Then, the control unit 17 determines a superimposition position of the virtual object 200 whose longitudinal direction is parallel to the virtual line 210 on the basis of the intersection X between the virtual line 210 and the line of sight (step S43). For example, the control unit 17 determines a superimposition position where the longitudinal direction is parallel to the virtual line 210 and an end of the virtual object 200 is superimposed on a hand of the user 2. Then, the control unit 17 controls the display of the displays 11 so that the virtual object 200 slides to the superimposition position along the virtual line 210 (step S44).

As a result, the HMD 10 can superimpose and display the end of the virtual object 200 on the hand of the user 2 positioned close to the line-of-sight direction of the user 2 and inside the superimposition area 100 while maintaining the display state of the virtual object 200 parallel to the virtual line 210. Furthermore, even when the interval between the right hand 4 and the left hand 5 of the user 2 changes, the HMD 10 can reduce the sense of incongruity in the localization of the virtual object 200 with respect to the both hands. When the processing procedure illustrated in FIG. 12 is completed, the control unit 17 returns to FIG. 11 and ends the processing procedure illustrated in FIG. 11.

Alternatively, if the control unit 17 determines that the position information of one hand cannot be acquired (Yes in step S20), the position information of the both hands of the user 2 has not been acquired, and thus the processing proceeds to step S50.

The control unit 17 executes the second display control processing (step S50). The second display control processing includes, for example, the first exception processing described above. The second display control processing includes, for example, the processing procedure illustrated in FIG. 13.

As illustrated in FIG. 13, the control unit 17 acquires the posture of a hand other than the hand inside the superimposition area 100 (step S51). For example, the control unit 17 estimates the posture of the other hand of the user 2 on the basis of the image information of the imaging devices 12 and acquires the posture information 164 indicating the estimated posture. Then, the control unit 17 estimates the longitudinal direction of the virtual object 200 on the basis of the acquired posture (step S52). For example, the control unit 17 estimates the longitudinal direction of the virtual object 200 on the basis of the acquired posture of the other hand, the line-of-sight direction, the type and the shape of the virtual object 200, and the like. Then, the control unit 17 controls the display of the displays 11 so that an end of the virtual object 200 slides to a superimposition position of the other hand along the longitudinal direction (step S53).

As a result, in a case where the position information of one hand cannot be acquired, the HMD 10 can display the virtual object 200 on the displays 11 so that an end of the virtual object 200 is superimposed on the other hand of the user and that the longitudinal direction of the virtual object 200 is directed in a direction corresponding to the posture of the other hand. Furthermore, even if the position of one hand of the user 2 is unknown, the HMD 10 can reduce sense of incongruity in the localization of the virtual object 200 with respect to the other hand. When the processing procedure illustrated in FIG. 13 is completed, the control unit 17 returns to FIG. 11 and ends the processing procedure illustrated in FIG. 11.

Further alternatively, if it is determined that the virtual object 200 is displayed within the superimposition area 100 (Yes in step S30), the control unit 17 advances the processing to step S60.

The control unit 17 executes the third display control processing (step S60). The third display control processing includes, for example, the second exception processing described above. The third display control processing includes, for example, the processing procedure illustrated in FIG. 14.

As illustrated in FIG. 14, the control unit 17 determines a hand of the user 2 inside the superimposition area 100 that serves as a reference (step S61). For example, the control unit 17 determines a hand suitable for holding the virtual object 200 as a reference. Then, the control unit 17 acquires the position and the posture of the reference hand (step S62). For example, the control unit 17 the control unit 17 estimates the position and the posture of the other hand of the user 2 on the basis of the image information of the imaging devices 12 and acquires position information and the posture information 164 of the reference hand. Then, the control unit 17 estimates the longitudinal direction of the virtual object 200 on the basis of the acquired position and posture (step S63). The control unit 17 estimates the longitudinal direction that is parallel to the virtual line 210 of the both hands. Then, the control unit 17 controls the display of the displays 11 so that the virtual object 200 is superimposed on the reference hand along the longitudinal direction (step S64).

As a result, in a case where the entire virtual object 200 is displayed inside the superimposition area 100, the HMD 10 can display the virtual object 200 on the displays 11 so that an end of the virtual object 200 is superimposed on the reference hand of the user. Furthermore, even if the hand different from the reference hand of the user 2 changes, the HMD 10 can reduce sense of incongruity in the localization of the virtual object 200 with respect to the reference hand. When the processing procedure illustrated in FIG. 14 is completed, the control unit 17 returns to FIG. 11 and ends the processing procedure illustrated in FIG. 11.

In the processing procedure illustrated in FIG. 11, the case where the control unit 17 functions as the display control unit 17B by executing the processing from step S20 to step S60 has been described; however, it is not limited thereto.

Note that the above-described embodiment is an example, and various modifications and applications are possible.

Hardware Configuration

Figure 15:
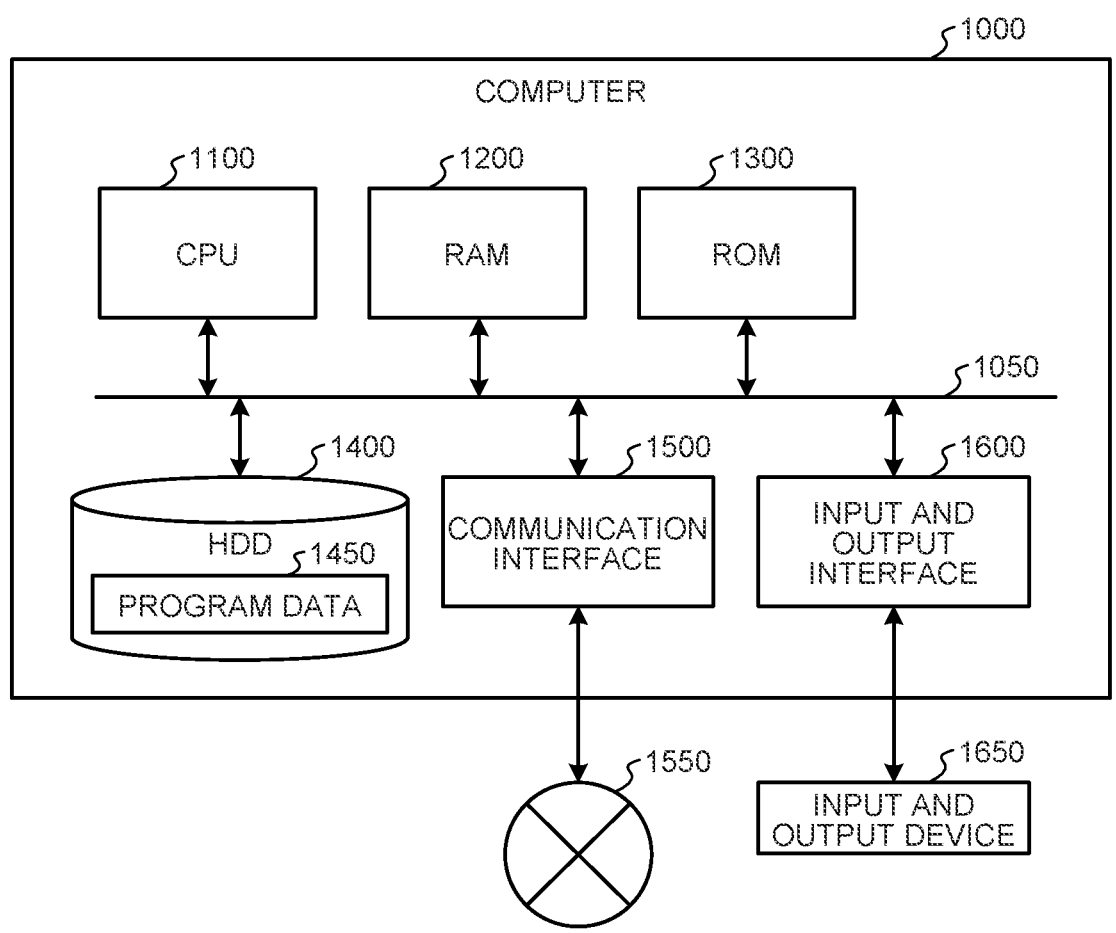
FIG. 15 is a hardware configuration diagram illustrating an example of a computer that implements the functions of a display control device.

A display control device according to the above-described embodiments is implemented by, for example, a computer 1000 having a configuration as illustrated in FIG. 15. Hereinafter, the control unit 17 of the HMD 10 corresponding to the display control device according to the embodiment will be described as an example. FIG. 15 is a hardware configuration diagram illustrating an example of a computer 1000 that implements the functions of the display control device. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records a program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard and a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium. A medium is, for example, an optical recording medium such as a digital versatile disc (DVD), a magneto-optical recording medium such as a magneto-optical disk (MO), a tape medium, a magnetic recording medium, a semiconductor memory, or the like.

For example, in a case where the computer 1000 functions as the information processing device according to the embodiment, the CPU 1100 of the computer 1000 implements the control unit 17 including the functions of the acquisition unit 17A, the display control unit 17B, or the like by executing a program loaded on the RAM 1200. The HDD 1400 also stores a program according to the present disclosure or data in the storage unit 16. Note that although the CPU 1100 reads the program data 1450 from the HDD 1400 and executes the program data 1450, as another example, these programs may be acquired from another device via the external network 1550.

Although the preferred embodiments of the present disclosure have been described in detail by referring to the accompanying drawings, the technical scope of the present disclosure is not limited to such examples. It is obvious that a person having ordinary knowledge in the technical field of the present disclosure can conceive various modifications or variations within the scope of the technical idea described in the claims, and it is naturally understood that these also belong to the technical scope of the present disclosure.

Furthermore, the effects described in the present specification are merely illustrative or exemplary and are not limiting. That is, the technology according to the present disclosure can achieve other effects that are obvious to those skilled in the art from the description of the present specification together with or instead of the above effects.

Furthermore, it is also possible to create a program for causing hardware such as a CPU, a ROM, and a RAM built in a computer to implement functions equivalent to the configuration of the HMD 10 and to provide a computer-readable recording medium recording the program.

Meanwhile, the steps according to the processing of the information processing device in the present specification are not necessarily processed in time series in the order described in the flowchart. For example, the steps according to the processing of the information processing device may be processed in an order different from the order described in the flowchart or may be processed in parallel.

(Effects)

The control unit 17 includes: the acquisition unit 17A that acquires the right hand position information 161 indicating the position of the right hand 4 of the user 2 of the HMD 10 and the left hand position information 162 indicating the position of the left hand 5 of the user 2; and the display control unit 17B that controls the HMD 10 so as to arrange the virtual object 200 having a certain size at the position of the right hand 4 and the position of the left hand 5 on the basis of the right hand position information 161 and the left hand position information 162. The display control unit 17B controls the HMD 10 so as to change the position of the virtual object 200 independently of a change in the distance between the right hand 4 and the left hand 5 while maintaining the display state of the virtual object 200 in which the longitudinal direction of the arranged virtual object 200 is parallel to a virtual line 210 connecting the right hand 4 and the left hand 5.

As a result, even if the interval between the both hands of the user 2 changes, the control unit 17 can maintain the parallel relationship with respect to the virtual line 210 between the both hands of the user 2 and localize the virtual object 200 by referring to the positions of the both hands. This results in achievement of effects that the control unit 17 can suppress the sense of incongruity in the localization of the virtual object 200 with respect to the both hands even if the interval between the both hands of the user 2 changes.

In the control unit 17, the acquisition unit 17A acquires the line-of-sight information 163 indicating the line-of-sight direction of the user 2, and the display control unit 17B controls the HMD 10 so as to change the position of the virtual object 200 independently of a change in the distance between the right hand 4 and the left hand 5 on the basis of a change in the line-of-sight direction.

As a result, the control unit 17 can localize the virtual object 200 by referring to the line-of-sight direction and the positions of the both hands of the user 2 even when the interval between the both hands of the user 2 changes. As a result, even if the interval between the both hands of the user 2 changes, the control unit 17 can arrange the virtual object 200 at a position suitable for the line-of-sight direction of the user 2, and thus it is possible to suppress the sense of incongruity in the localization of the virtual object 200.

In the control unit 17, the display control unit 17B determines a superimposition position of the virtual object 200 with respect to at least one of the right hand 4 or the left hand 5 on the basis of the intersection X of a line extending in the line-of-sight direction and the virtual line 210.

As a result, the control unit 17 can determine the superimposition position of the virtual object 200 on the basis of the line-of-sight position of the user 2 on the virtual line 210 connecting the both hands of the user 2. As a result, even if the interval between the both hands of the user 2 changes, the control unit 17 can arrange the virtual object 200 at a position suitable for the line-of-sight position of the user 2 on the virtual line 210. Therefore, it is possible to further suppress the sense of incongruity in the localization of the virtual object 200.

In the control unit 17, in a case where one hand of the user moves to the outside of the superimposition area 100 of the HMD 10 depending on a change in the line-of-sight direction, the display control unit 17B controls the HMD 10 so that the virtual object 200 parallel to the virtual line 210 is superimposed at the position of the other hand of the user 2 positioned inside the superimposition area 100.

As a result, in a case where the one hand of user 2 is positioned outside the superimposition area 100 and the other hand is positioned inside the superimposition area 100, the control unit 17 can superimpose and display the virtual object 200 that is parallel to virtual line 210 on the position of the other hand of user 2 positioned inside the superimposition area 100. As a result, the control unit 17 can arrange the virtual object 200 in the hand of the user 2 that is positioned inside the superimposition area 100, and thus it is possible to further suppress the sense of incongruity in the localization of the virtual object 200.

In the control unit 17, the virtual object 200 includes at least one of a weapon object or an operation object.

As a result, by operating at least one of the weapon object or the operation object, even if the inclination of the virtual line 210 connecting the both hands of the user 2 changes, the control unit 17 can superimpose and display the virtual object 200 that is parallel to the virtual line 210 at the position of the other hand of user 2 positioned inside the superimposition area 100. As a result, the control unit 17 can arrange the virtual object 200 in the hand of the user 2 that is positioned inside the superimposition area 100, and thus it is possible to further suppress the sense of incongruity in the localization of the virtual object 200 to be operated.

In the control unit 17, when the right hand 4 and the left hand 5 of the user 2 are positioned outside the superimposition area 100 and the virtual line 210 is positioned inside the superimposition area 100 of the HMD 10, the display control unit 17B determines the superimposition position of the virtual object by referring to the position of the intersection X.

As a result, in a case where the both hands of the user 2 are positioned outside the superimposition area 100, the control unit 17 can determine the superimposition position of the virtual object 200 on the basis of the relationship between the virtual line 210 inside the superimposition area 100 and the intersection X with the line of sight. As a result, even if the both hands of the user 2 are positioned outside the superimposition area 100, the control unit 17 can arrange the virtual object 200 at a position suitable for the line-of-sight direction of the user 2, and thus it is possible to suppress the sense of incongruity in the localization of the virtual object 200.

In a case where the acquisition unit 17A acquires position information of the hands of the user 2 from the image information of the imaging devices 12 of the HMD 10 and the display control unit 17B cannot acquire position information of one on the hands of the user 2, whereas the other hand of the user 2 is positioned inside the superimposition area 100 of the HMD 10, the control unit 17 controls the HMD 10 so that an end of the virtual object 200 is superimposed on the one hand without setting the virtual line 210.

As a result, in a case where position information of one hand of the user 2 cannot be acquired, the control unit 17 can superimpose the end of the virtual object 200 on the other hand that is inside the superimposition area 100. As a result, even in a case where position information of the one hand of the user 2 cannot be acquired, the control unit 17 can suppress the sense of incongruity in the localization of the virtual object 200.

The control unit 17 controls the HMD 10 so that the acquisition unit 17A acquires the posture information 164 of the hand of the user 2 on the basis of image information and that the display control unit 17B changes the longitudinal direction of the virtual object 200 on the basis of a change in the posture of the one hand of the user 2 positioned inside the superimposition area 100.

As a result, in a case where position information of one hand of the user 2 cannot be acquired, the control unit 17 can change the longitudinal direction of the virtual object 200 depending on a change in the posture of the other hand. As a result, the control unit 17 can superimpose and display the virtual object 200 along the longitudinal direction depending on the posture of the other hand, and thus it is possible to suppress a sense of sense of incongruity in the localization of the virtual object 200.

In a case where the entire virtual object 200 is positioned inside the superimposition area 100, the control unit 17 controls the HMD 10 so that the display control unit 17B changes the position of the virtual object 200 depending on at least one of the position or the posture of one hand of the user 2 positioned inside the superimposition area 100 of the HMD 10.

As a result, in a case where the entire virtual object 200 is positioned inside the superimposition area 100, the control unit 17 can change the position of the virtual object 200 depending on at least one of the position or the posture of the one hand of the user 2. As a result, the control unit 17 does not change the superimposition position of the virtual object 200 in accordance with the interval between the both hands of the user 2, and thus it is possible to suppress the sense of incongruity in the localization of the virtual object 200.

In the control unit 17, the display control unit 17B ignores changes in the position or the posture of the other hand of the user 2 that is different from the one hand.

As a result, in a case where the entire virtual object 200 is positioned inside the superimposition area 100, if the both hands are positioned inside the superimposition area 100, the control unit 17 can ignore the change in the position or the posture of the other hand of the user 2. As a result, even if the virtual line 210 can be set on the basis of the positions of the both hands, the control unit 17 does not change the position of the virtual object 200 in accordance with the position or the posture of the one hand inside the superimposition area 100, and thus it is possible to further suppress the sense of incongruity of the localization of the virtual object 200.

The control unit 17 is used in the HMD 10 including the displays 11 disposed in front of the eyes of the user 2.

As a result, even if the interval between the both hands of the user 2 changes, the control unit 17 can control the display of the HMD 10 so as to maintain the parallel relationship with respect to the virtual line 210 between the both hands of the user 2 and to localize the virtual object 200 by referring to the positions of the both hands. This results in achievement of effects that the control unit 17 can suppress the sense of incongruity in the localization of the virtual object 200 with respect to the both hands even if the interval between the both hands of the user 2 of the HMD 10 changes.

A display control method includes: by a computer, acquiring the right hand position information 161 indicating the position of the right hand 4 of the user 2 of the HMD 10 and the left hand position information 162 indicating the position of the left hand 5 of the user 2; controlling the HMD 10 so as to arrange the virtual object 200 having a certain size at the position of the right hand 4 and the position of the left hand 5 on the basis of the right hand position information 161 and the left hand position information 162; and controlling the HMD 10 so as to change the position of the virtual object 200 independently of a change in the distance between the right hand 4 and the left hand 5 while maintaining a display state of the virtual object 200 in which the longitudinal direction of the arranged virtual object 200 is parallel to the virtual line 210 connecting the right hand 4 and the left hand 5.

As a result, even if the interval between the both hands of the user 2 changes, the computer can control the display of the HMD 10 so as to maintain the parallel relationship with respect to the virtual line 210 between the both hands of the user 2 and to localize the virtual object 200 by referring to the positions of the both hands. This results in achievement of effects that the computer can suppress the sense of incongruity in the localization of the virtual object 200 with respect to the both hands even if the interval between the both hands of the user 2 of the HMD 10 changes.

A recording medium is a computer-readable recording medium recording a program for causing a computer to implement: acquiring the right hand position information 161 indicating the position of the right hand 4 of the user 2 of the HMD 10 and the left hand position information 162 indicating the position of the left hand 5 of the user 2; controlling the HMD 10 so as to arrange the virtual object 200 having a certain size at the position of the right hand 4 and the position of the left hand 5 on the basis of the right hand position information 161 and the left hand position information 162; and controlling the HMD 10 so as to change the position of the virtual object 200 independently of a change in the distance between the right hand 4 and the left hand 5 while maintaining a display state of the virtual object 200 in which the longitudinal direction of the arranged virtual object 200 is parallel to the virtual line 210 connecting the right hand 4 and the left hand 5.

As a result, even if the interval between the both hands of the user 2 changes, the recording medium can control the display of the HMD 10 by the computer so as to maintain the parallel relationship with respect to the virtual line 210 between the both hands of the user 2 and to localize the virtual object 200 by referring to the positions of the both hands. This results in achievement of effects that the recording medium can suppress the sense of incongruity in the localization of the virtual object 200 with respect to the both hands even if the interval between the both hands of the user 2 of the HMD 10 changes.

Note that the following configurations also belong to the technical scope of the present disclosure.

(1)

A display control device including:

an acquisition unit configured to acquire right hand position information indicating a position of a right hand of a user of a head mounted display and left hand position information indicating a position of a left hand of the user; and a display control unit that controls the head mounted display so as to arrange a virtual object having a certain size at the position of the right hand and the position of the left hand on a basis of the right hand position information and the left hand position information, wherein the display control unit controls the head mounted display so as to change a position of the virtual object independently of a change in a distance between the right hand and the left hand while maintaining a display state of the virtual object in which a longitudinal direction of the virtual object that is arranged is parallel to a virtual line connecting the right hand and the left hand.

(2)
The display control device according to (1),
wherein the acquisition unit acquires line-of-sight information indicating a line-of-sight direction of the user, and
the display control unit controls the head mounted display so as to change the position of the virtual object independently of a change in the distance between the right hand and the left hand on the basis of a change in the line-of-sight direction.

(3)
The display control device according to (2),
wherein the display control unit determines a superimposition position of the virtual object with respect to at least one of the right hand and the left hand on a basis of an intersection of a line extending in the line-of-sight direction and the virtual line.

(4)
The display control device according to (2) or (3),
wherein, in a case where one hand of the user moves to an outside of a superimposition area of the head mounted display depending on a change in the line-of-sight direction, the display control unit controls the head mounted display so as to superimpose the virtual object parallel to the virtual line at a position of the other hand of the user positioned inside the superimposition area.

(5)
The display control device according to (4),
wherein the virtual object includes at least one of a weapon object and an operation object.

(6)
The display control device according to (3),
wherein, in a case where the right hand and the left hand of the user are positioned outside the superimposition area of the head mounted display and the virtual line is positioned inside the superimposition area, the display control unit determines the superimposition position of the virtual object by referring to a position of the intersection.

(7)
The display control device according to any one of (1) to (6),
wherein the acquisition unit acquires position information of a hand of the user from image information of an imaging device of the head mounted display, and
in a case where position information of one hand of the user cannot be acquired and the other hand of the user is positioned inside a superimposition area of the head mounted display, the display control unit does not set the virtual line and controls the head mounted display so as to superimpose an end of the virtual object on the other hand.

(8)
The display control device according to (7),
wherein the acquisition unit acquires posture information of a hand of the user on a basis of the image information, and
the display control unit controls the head mounted display so as to change the longitudinal direction of the virtual object on a basis of a change in a posture of one hand of the user positioned inside the superimposition area.

(9)
The display control device according to any one of (1) to (6),
wherein, in a case where the entire virtual object is positioned inside a superimposition area of the head mounted display, the display control unit controls the head mounted display so as to change a position of the virtual object depending on at least one of a position and a posture of one hand of the user positioned inside the superimposition area.

(10)
The display control device according to (9),
wherein the display control unit ignores a change in a position and a posture of the other hand of the user that is different from one hand.

(11)
The display control device according to any one of (1) to (10),
wherein the display control device is used in a head mounted display including a display disposed in front of an eye of the user.

(12)
A display control method including the steps of:
by a computer,
acquiring right hand position information indicating a position of a right hand of a user of a head mounted display and left hand position information indicating a position of a left hand of the user;
controlling the head mounted display so as to arrange a virtual object having a certain size at the position of the right hand and the position of the left hand on a basis of the right hand position information and the left hand position information; and
controlling the head mounted display so as to change a position of the virtual object independently of a change in a distance between the right hand and the left hand while maintaining a display state of the virtual object in which a longitudinal direction of the virtual object that is arranged is parallel to a virtual line connecting the right hand and the left hand.

(13)
A computer-readable recording medium recording a program for causing a computer to implement:
acquisition of right hand position information indicating a position of a right hand of a user of a head mounted display and left hand position information indicating a position of a left hand of the user;
control of the head mounted display so as to arrange a virtual object having a certain size at the position of the right hand and the position of the left hand on a basis of the right hand position information and the left hand position information; and
control of the head mounted display so as to change a position of the virtual object independently of a change in a distance between the right hand and the left hand while maintaining a display state of the virtual object in which a longitudinal direction of the virtual object that is arranged is parallel to a virtual line connecting the right hand and the left hand.

(14)
A program for causing a computer to implement:
acquisition of right hand position information indicating a position of a right hand of a user of a head mounted display and left hand position information indicating a position of a left hand of the user;
control of the head mounted display so as to arrange a virtual object having a certain size at the position of the right hand and the position of the left hand on the basis of the right hand position information and the left hand position information; and
control of the head mounted display so as to change a position of the virtual object independently of a change in a distance between the right hand and the left hand while maintaining a display state of the virtual object in which a longitudinal direction of the virtual object that is arranged is parallel to a virtual line connecting the right hand and the left hand.

REFERENCE SIGNS LIST

1 AR GLASSES SYSTEM
10 HEAD MOUNT UP DISPLAY (HMD)
11 DISPLAY
12 IMAGING DEVICE
13 SENSOR UNIT
14 COMMUNICATION UNIT
15 SPEAKER
16 STORAGE UNIT
17 CONTROL UNIT
17A ACQUISITION UNIT
17B DISPLAY CONTROL UNIT
20 WEARABLE DEVICE
21 MOTION SENSOR
22 COMMUNICATION UNIT
23 CONTROL UNIT
100 SUPERIMPOSITION AREA
200 VIRTUAL OBJECT
210 VIRTUAL LINE

The invention claimed is:

1. A display control device, including:
   circuitry configured to:
   acquire right hand position information that indicates a position of a right hand of a user of a head mounted display and left hand position information that indicates a position of a left hand of the user; and
   control the head mounted display to arrange a virtual object having a specific size at the position of the right hand and the position of the left hand based on the right hand position information and the left hand position information,
   wherein the head mounted display is controlled to change a position of the virtual object independently of a change in a distance between the right hand and the left hand while maintaining a display state of the virtual object in which a longitudinal direction of the arranged virtual object is parallel to a virtual line connecting the right hand and the left hand.

2. The display control device according to claim 1, wherein the circuitry is further configured to:
   acquire line-of-sight information indicating a line-of-sight direction of the user, and
   control the head mounted display to change the position of the virtual object, independently of the change in the distance between the right hand and the left hand, based on the a change in the line-of-sight direction.

3. The display control device according to claim 2, wherein the circuitry is further configured to determine a superimposition position of the virtual object with respect to at least one of the right hand or the left hand based on an intersection of a line extending in the line-of-sight direction and the virtual line.

4. The display control device according to claim 3, wherein, in a case where the right hand and the left hand of the user are positioned outside a superimposition area of the head mounted display and the virtual line is positioned inside the superimposition area, the circuitry is further configured to determine the superimposition position of the virtual object by referring to a position of the intersection.

5. The display control device according to claim 2, wherein, in a case where one hand of the left hand or the right hand of the user moves to an outside of a superimposition area of the head mounted display depending on a change in the line-of-sight direction, the circuitry is further configured to control the head mounted display to superimpose the virtual object parallel to the virtual line at a position of the other hand of the user positioned inside the superimposition area, and
   the other hand of the user is different from the one hand of the left hand or the right hand.

6. The display control device according to claim 5, wherein the virtual object includes at least one of a weapon object or an operation object.

7. The display control device according to claim 1, wherein the circuitry is further configured to acquire position information of one hand of the left hand or the right hand of the user from image information of an imaging device of the head mounted display, and
   in a case where the position information of the one hand of the left hand or the right hand of the user cannot be acquired and the other hand of of the user is positioned inside a superimposition area of the head mounted display, the circuitry is further configured to:
   not set the virtual line; and
   control the head mounted display to superimpose an end of the virtual object on the other hand of the user, wherein the other hand of the user is different from the one hand of the left hand or the right hand.

8. The display control device according to claim 7, wherein the circuitry is further configured to:
   acquire posture information of one of the left hand or the right hand of the user based on the image information; and
   control the head mounted display to change the longitudinal direction of the virtual object based on a change in a posture of one of the left hand or the right hand of the user positioned inside the superimposition area.

9. The display control device according to claim 1, wherein, in a case where the entire virtual object is positioned inside a superimposition area of the head mounted display, the circuitry is further configured to control the head mounted display to change a position of the virtual object depending on at least one of a position and a posture of one hand of the left hand or the right hand of the user positioned inside the superimposition area.

10. The display control device according to claim 9, wherein the circuitry is further configured to ignore a change in a position and a posture of the other hand of the user that is different from the one hand of the left hand or the right hand.

11. The display control device according to claim 1, wherein the display control device is used in the head mounted display including a display disposed in front of an eye of the user.

12. A display control method implemented by a computer, the method comprising:
   acquiring right hand position information indicating a position of a right hand of a user of a head mounted display and left hand position information indicating a position of a left hand of the user;
   controlling the head mounted display to arrange a virtual object having a specific size at the position of the right hand and the position of the left hand based on the right hand position information and the left hand position information; and
   controlling the head mounted display to change a position of the virtual object independently of a change in a distance between the right hand and the left hand while maintaining a display state of the virtual object in which a longitudinal direction of the arranged virtual object is parallel to a virtual line connecting the right hand and the left hand.

13. A non-transitory computer-readable medium having stored thereon, computer-executable instructions which, when executed by a computer, cause the computer to execute operations, the operations comprising:

acquiring right hand position information indicating a position of a right hand of a user of a head mounted display and left hand position information indicating a position of a left hand of the user;

controlling the head mounted display to arrange a virtual object having a specific size at the position of the right hand and the position of the left hand based on the right hand position information and the left hand position information; and controlling the head mounted display to change a position of the virtual object independently of a change in a distance between the right hand and the left hand while maintaining a display state of the virtual object in which a longitudinal direction of the arranged virtual object is parallel to a virtual line connecting the right hand and the left hand.

\* \* \* \* \*